(12) United States Patent
Bird et al.

(10) Patent No.: US 6,636,789 B2
(45) Date of Patent: Oct. 21, 2003

(54) METHOD AND SYSTEM OF REMOTE DELIVERY OF ENGINE ANALYSIS DATA

(75) Inventors: John A. Bird, Portage, MI (US); Martin P. Franz, Portage, MI (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 09/844,616

(22) Filed: Apr. 27, 2001

(65) Prior Publication Data

US 2002/0161493 A1 Oct. 31, 2002

(51) Int. Cl.$^7$ .............................................. G01M 17/00
(52) U.S. Cl. .............................. 701/29; 701/33; 701/35; 701/36; 702/108; 340/438
(58) Field of Search .............................. 701/29, 33, 35, 701/36, 31, 102, 115; 702/108, 113, 121, 122; 324/379; 340/438; 73/116, 117.3, 118.1

(56) References Cited

U.S. PATENT DOCUMENTS

| | | | |
|---|---|---|---|
| 4,418,388 A | 11/1983 | Allgor et al. ................. 701/99 |
| 4,903,220 A * | 2/1990 | Johnson ....................... 701/29 |
| 5,160,892 A | 11/1992 | Makhija et al. .............. 324/379 |
| 5,481,193 A * | 1/1996 | Mueller et al. .............. 324/379 |
| 5,631,831 A | 5/1997 | Bird et al. .................... 701/29 |
| 5,732,074 A | 3/1998 | Spaur et al. ................. 370/313 |
| 5,796,953 A | 8/1998 | Zey et al. .................... 709/227 |
| 6,029,508 A | 2/2000 | Schoenbeck et al. ......... 73/116 |
| 6,055,468 A | 4/2000 | Kaman et al. ................ 701/29 |
| 6,285,932 B1 * | 9/2001 | de Bellefeuille et al. ..... 701/33 |
| 6,362,730 B2 * | 3/2002 | Razavi et al. ............... 340/438 |

* cited by examiner

*Primary Examiner*—Marthe Y. Marc-Coleman
(74) *Attorney, Agent, or Firm*—Baker & Hostetler LLP

(57) ABSTRACT

A vehicle analysis system includes a system analyzer, such as an engine analyzer, having probes that gather data from vehicle parameters such as engine components. The data is converted into digital signals, which are processed into display data and stored in a computer memory. A controller converts the display data into packets that may be transmitted across a communications network to a remote computer using transmission control protocol/Internet protocol.

20 Claims, 3 Drawing Sheets

METHOD AND SYSTEM OF REMOTE DELIVERY OF ENGINE ANALYSIS DATA

FIELD OF THE INVENTION

The present invention relates generally to analyzers for use in testing vehicle components. More particularly, the present invention relates to a method and system for remote communication with, and control of, internal combustion engine analyzers using transmission control protocol/Internet protocol connections.

BACKGROUND OF THE INVENTION

Vehicle system diagnostic equipment is commonly used to diagnose problems with vehicle systems such as automotive engines. In a typical apparatus of this type, an analyzer system includes several leads or test probes that a mechanic attaches to various areas of a vehicle, and the system uses these probes to gather various types of information while the mechanic performs certain actions such as maintaining the engine under load or starting the engine. The results of such tests, and knowledge about the vehicle or engine type, trouble symptoms, allowable limits, and other data can lead to a diagnosis of a problem. Diagnosis usually points to some corrective action such as the replacement of parts or the performance of system adjustments by the mechanic.

U.S. Pat. No. 5,160,892, to Makhija et al., teaches one such engine analyzer system. The analyzer system includes an analog section that receives analog input signals, such as signals derived from the ignition system of a vehicle, and an analog-to-digital converter for periodically sampling the analog input waveform and converting each sample to a digital value representative of a point on the analog waveform. The system also includes a display for displaying a simulated visual representation of the digital values in the form of an analog waveform. The display represents a function of the internal combustion engine.

U.S. Pat. No. 5,631,831, to Bird et al., discloses another method for diagnosing vehicle systems. Bird et al. discloses a system for diagnosing vehicle faults including a diagnostics control module, a vehicle testing module, an evaluation module, and a data source. The diagnostics control module issues diagnostic commands, and a test module initiates tests on the vehicle. The evaluation model receives data from each data source in response to the diagnostic commands to determine whether an initial root fault may exist in the vehicle.

With the advent of vehicle repair center franchises, as well as networks of affiliated repair shops such as those connected with a particular car manufacturer, it has become increasingly important for repair shops within a network or franchise chain to be able to share information with each other, as well as to draw on the resources and expertise that may be found in other shops within the chain or network. If a system were available in which the test results from a vehicle located in one repair shop could instantaneously be viewed by a technician located in a remote repair shop, significant economies could result. For example, technicians having specialized expertise could more easily share that expertise among multiple repair locations, while the multiple locations could be staffed with less costly general technicians who, while competent, may not be familiar with every specific problem. In addition, technicians in remote locations could help train technicians in multiple locations by being able to view engine data on an instantaneous basis.

Accordingly, it is desirable to provide an improved engine analysis method and system having remote communications capability so that the results of an engine analysis can be viewed in multiple locations.

SUMMARY OF THE INVENTION

It is therefore a feature and advantage of the present invention to provide an improved vehicle system analyzer having remote communication capability.

The above and other features and advantages are achieved through the use of a novel engine analyzer method and system as herein disclosed. In accordance with one embodiment of the present invention, a vehicle component analysis system includes at least one probe that is capable of retrieving analog signals representative of the operation of a vehicle system or systems. The probes are connected to various parts of the vehicle, such as the vehicle's engine. The system also includes an analog-to-digital converter system capable of receiving the analog signals and converting the signals into digital format signals. The system also includes a processor system for converting the digital format signals into display data. A memory stores the digital format signals. The memory includes a direct memory access for directing the digital format signals into the memory. The system also includes a controller for assembling the displayed data into packets of transmission of a communications network. The controller may be either integral with or external to the system.

Preferably, the packets conform to transmission control protocol/Internet protocol. Optionally, the controller includes at least one of a network card, an interface chip, and a protocol stack module. Also optionally, the system further includes at least one remote computer having display and a communications card. The communications card is capable of receiving the packets, and the computer further comprises a processor and a display controller capable of displaying information representative of the data in the packets on the display.

In accordance with another embodiment of the present invention, a method of analyzing data representative of vehicle operation includes the steps of collecting, using at least one probe, analog signals indicative of at least one vehicle component parameter. The steps also include converting, using analog-to-digital conversion circuitry, the analog signals into digital signals. The steps also include storing, using a direct memory access, the digital signals in a computer memory. The steps further include processing, using a computer processor, the digital signals into display data, as well as converting, using a controller, the display data into packets for transmission through a communications network. Preferably and optionally, the method also includes transmitting the packets to a remote computer via communications network. Preferably, the converting step is performed in accordance with transmission control protocol/Internet protocol. Also optionally, the collecting step may include direct collection of digital signals, in which case analog-to-digital conversion is not required.

There have thus been outlined the more important features of the invention in order that the detailed description thereof that follows may be better understood, and in order that the present contribution to the art may be better appreciated. There are, of course, additional features of the invention that will be described below and which will form at least part of the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting in any way.

As such, those skilled in the art will appreciate that the concept and objectives, upon which this disclosure is based, may be readily used as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
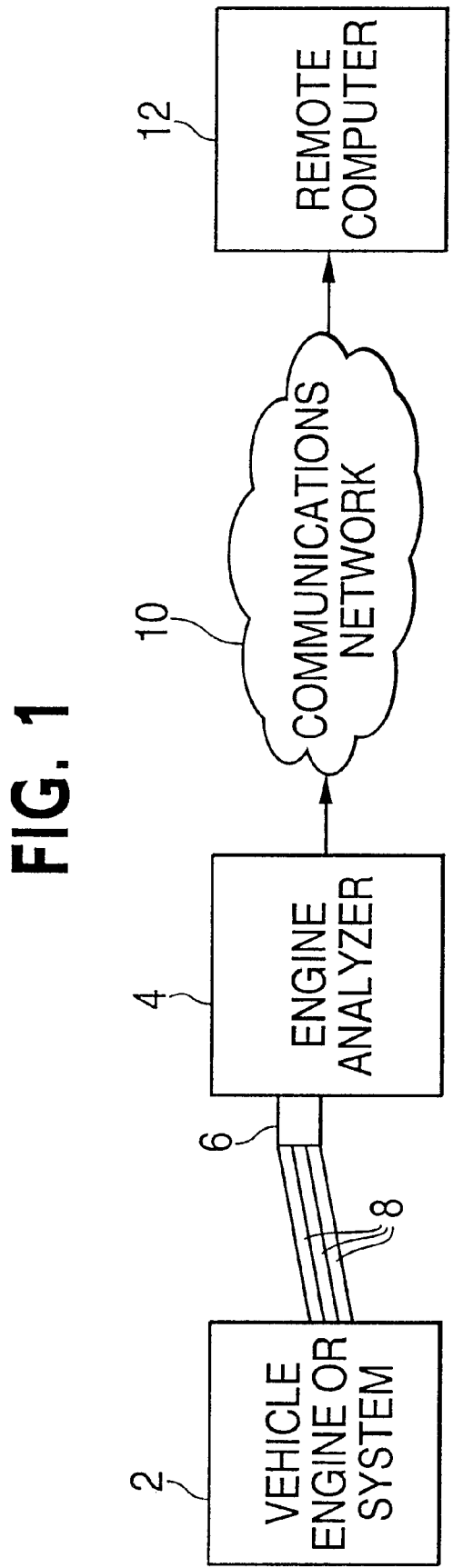
FIG. 1 is a block diagram that illustrates an exemplary engine analysis system in communication with a vehicle engine and a remote computer.

The present invention provides an improved method and system for communicating with and/or controlling an internal combustion engine analyzer. A preferred embodiment of the present inventive apparatus and method is illustrated in FIG. 1. The engine analysis system illustrated in FIG. 1 includes a vehicle engine or other component or system 2 and an analyzer 4 such as an engine analyzer that performs diagnostic tests on the vehicle engine or system 2. The analyzer 4 obtains data from the vehicle system 2 via a connecting cable 6 that includes one or more probes 8, and preferably two or more probes, that are operative to obtain data from various points within the vehicle system 2. The data collected by the analyzer 4 is transmitted to a remote computer 12 via a communications network 10 or a series of communication networks. On the remote computer 12, a user may view the data collected by analyzer 4 on a computer display in the form of digital data and/or in a waveform display format, such as the form of a digital oscilloscope.

Figure 2:
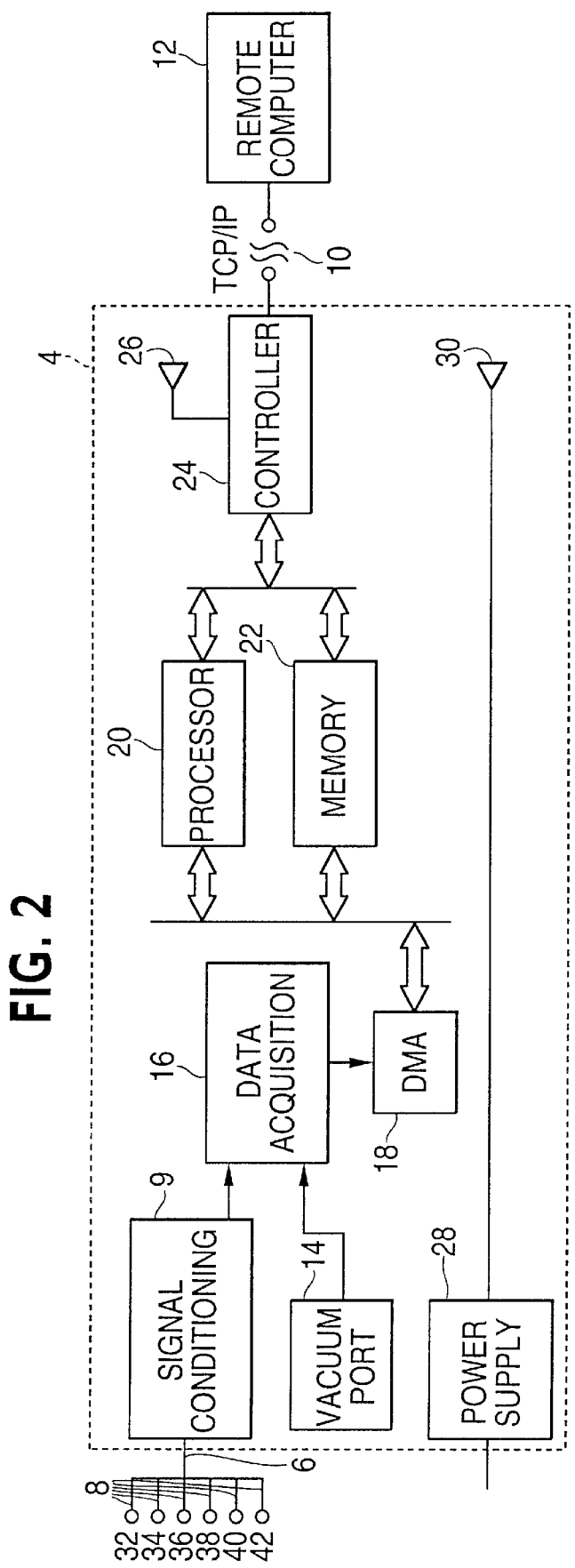
FIG. 2 provides additional detail, in block and schematic format, of the engine analysis system illustrated in FIG. 1.

FIG. 2 provides further detail of the analyzer 4 illustrated in FIG. 1 along with its features of connectivity to other elements of the system. The probes 8 are connected to signal conditioning circuitry 9 via a cable 6. The probes 8 are operative to receive various types of information, such as a primary waveform probe 32 and a secondary waveform probe 34. Primary waveform probe 32 and secondary waveform probe 34 are designed to receive, for example, voltage from the engine. An amperage probe 36 is operative to measure current from an appropriate point within the engine. Two oscilloscope probes, scope A probe 36 and scope B probe 38, are operative to receive analog data indicative of engine parameters such as vibration, oxygen use, and/or other parameters. A synchronization probe 42 is operative to receive pulses that are generated upon firing of an engine cylinder. The probes illustrated in FIG. 2 are only intended to be exemplary, and any combination of probes may in fact be used. Also optionally, the probes can be used to obtain digital signals from the vehicle, such as on-board diagnostics (OBD) codes or other data streams.

The analog signals from the probes 8 are received by the signal conditioning circuit 9 and delivered to data acquisition circuitry 16. Data acquisition circuitry 16 preferably includes an analog-to-digital converter system for converting the signals into a digitized format that can be understood by processor 20 and other digital circuitry elements. The analog-to-digital conversion is not required for any engine data that is already in digital form such as OBD codes or other digital data streams. The digitized data is then delivered to one or more processors 20 which generate display data based on the digitized probe data. The data may also, or alternatively, be stored in a memory 22 of the engine analyzer, and the direction of the data into specific areas of memory is controlled by a portion of memory designated as a direct memory access (DMA) area 18.

Probe data from memory 22 and/or display data from processor 20 may be delivered to a controller 24, such as an ethernet controller, that assembles the data into packets for transmission to a remote computer 12 via communications network 10. The controller 24 may include standard hardware such as a network card or interface chip or other interface hardware such as a card or an internal or external device that converts serial, parallel, or universal serial bus (USB) signals into transmission control protocol/Internet protocol (TCP/IP). The controller 24 may also include software, such as a protocol stack module, to perform such packet assembly and delivery using industry standard TCP/IP. The remote computer 12, which can be any standard desktop, laptop, or handheld personal computer equipped with a display and a modem or other communications device, is able to communicate with the engine analyzer 4 via the communications network 10. The computer is equipped with software operative to provide an Internet or world wide web browser, and the computer supplies the browser with an Internet protocol (IP) address. Using TCP/IP, the packets are delivered to the remote computer 12, where the data contained within the packets can be displayed on the display of the remote computer using the browser. Packets delivered from the engine analyzer to the computer may contain, for example, sampled data as well as both discrete measurements and waveforms. Using the TCP/IP protocol ensures high data transfer rates and relatively low costs by using standard hardware and software, along with a simple configuration.

The separation of the remote computer 12 and the engine analyzer 4 allows the engine analyzer to be small and portable. In fact, a display need not even be included with the engine analyzer module, although a display may be desired by the user and is therefore optional. It should be noted that the specific embodiment of the engine analyzer module shown in FIG. 2 is only intended to be illustrative of an exemplary embodiment of the present invention, and any engine analyzer module having communications capability using TCP/IP may be used.

In addition, because of the use of TCP/IP and the communications network, the engine analyzer may communicate with multiple remote computers 12. Conversely, a single computer or a network of computers may be configured to communicate with more than one engine analyzer. In addition, the communications network 10 may be a global network such as the Internet, or a limited access local area network (LAN) or wide area network (WAN). Optionally, the network may be a combination of a LAN and another network such as the Internet, and the communication between the networks would also implemented by TCP/IP. Control of the engine analyzer system by the processor 20 may be based upon a stored program in the engine analyzer module memory 22. Digitized waveforms produced, for example, by the conversion of analog data to digital data by data acquisition 16 are stored in data memory 22. The transfer of digitized waveforms from the data acquisition circuitry 16 to memory 22 is provided by DMA 18. The user of the remote computer 12 may send a request signal by the global communications network 10 to retrieve the digitized waveform data from memory 22 for display on the remote computer 12. The remote computer 12 will convert the digitized waveform into digital display data necessary to reproduce the waveform on the user's computer display. As long as the digital display data is retained by the remote computer 12, the display of the remote computer continues to display the same waveform.

Figure 3:
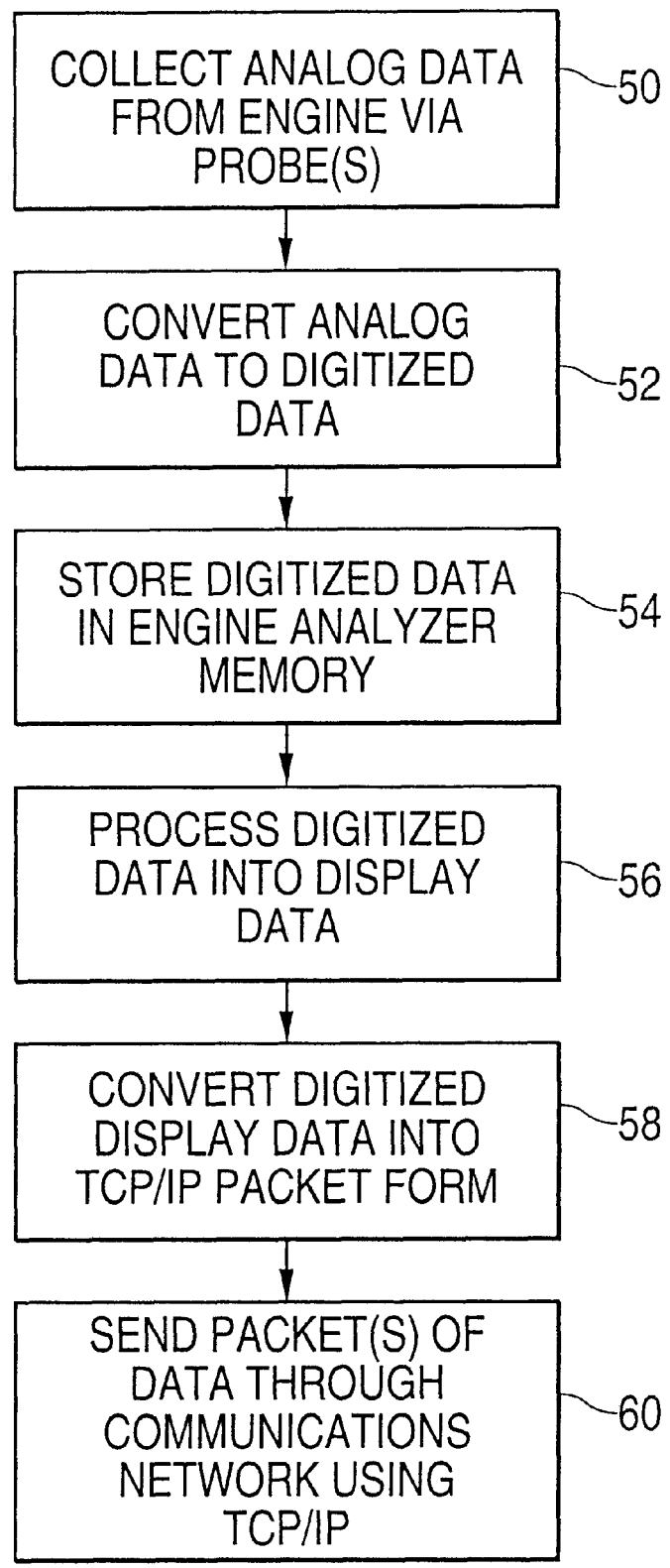
FIG. 3 illustrates an exemplary flow of information from a vehicle engine to a user computer.

FIG. 3 illustrates the operation of an embodiment of the present invention in the context of a flow diagram illustrating steps for transmitting and receiving information between a vehicle component and a user computer. First, analog signals indicative of engine or other vehicle component or system parameters, such as engine current, voltage, vibration, rotations per minute, and/or other information are collected by an engine analyzer using a plurality of probes 50. This analog data is converted to digitized data 52 using one or more analog-to-digital converter circuits. The digitized data is stored in a memory portion of the engine analyzer 54 and processed into a displayable data format 56. The controller converts the digitized display data into packets that may be transmitted over a communications network such as the Internet using TCP/IP protocol 58. Each packet is then transmitted away from the engine analyzer into the communications network for delivery to a remote computer 60.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to all of which may fall within the scope of the invention.

What is claimed is:

1. A vehicle component analysis system comprising:
    at least one probe for retrieving analog signals representative of an operation of a vehicle system;
    an analog-to-digital converter system capable of receiving the analog signals and converting the analog signals to digital format signals;
    a processor system for converting the digital format signals into display data;
    a memory for storing the digital format signals, the memory having a direct memory access for directing the digital format signals into the memory; and
    a controller for assembling the display data into packets for transmission through a communications network, wherein the at least one probe is for collecting direct digital signals indicative of at least one vehicle component parameter, wherein the analysis system is for directly storing and processing the direct digital signals without conversion of the direct digital signals using analog-to-digital conversion circuitry.

2. The system of claim 1 wherein the packets conform to transmission control protocol/Internet protocol.

3. The system of claim 1 wherein the controller includes at least one of a network card, an interface chip, and a protocol stack module.

4. The system of claim 3 wherein the controller is integral with the system.

5. The system of claim 3 wherein the controller is an external controller.

6. The system of claim 1 further comprising at least one remote computer having a display and a communications card, the communications card for receiving the packets, and the computer further comprising a processor and a display controller for displaying information representative of the data in the packets on the display.

7. A method of gathering, displaying, or analyzing data representative of vehicle operation, comprising:
    collecting, using at least one probe, analog signals indicative of at least one vehicle component parameter;
    converting, using analog-to-digital conversion circuitry, the analog signals into digital signals;
    storing, using a direct memory access, the digital signals in a computer memory;
    processing, using a computer processor, the digital signals into display data; and
    converting, using a controller, the display data into packets for transmission through a communications network, wherein the collecting step also includes collecting direct digital signals indicative of at least one vehicle component parameter, and further including the step of directly storing and processing the direct digital signals without conversion of the direct digital signals using analog-to-digital conversion circuitry.

8. The method of claim 7 further comprising transmitting the packets to at least one remote computer via the communications network.

9. The method of claim 7 wherein the converting step is performed in accordance with transmission control protocol/Internet protocol.

10. The method of claim 7 wherein the storing and the processing are performed in parallel.

11. A system for vehicle component analysis, comprising:
    means for retrieving data signals corresponding to at least one vehicle component parameter;
    means for converting the data signals into digital signals;
    means for storing the digital signals in a computer memory;
    means for processing the digital signals into display data; and
    means for assembling the display data into pockets for communication through a communications network, wherein said means for retrieving is to retrieve direct digital signals indicative of at least one vehicle component parameter and said means for processing is to process, the direct digital signals without conversion of the direct digital signals using analog-to-digital conversion circuitry.

12. The system of claim 11, wherein at least one of the data signals is an analog signal, and further comprising a means for converting analog signals into digital signals.

13. The system of claim 12, wherein said means for converting comprises an analog-to-digital converter.

14. The system of claim 11, further comprising a means for transmitting the packets to at least one remote computer via a communications network.

15. The system of claim 11, further comprising a means for retrieving the packets and presenting the packets to a user as a waveform.

16. The system of claim 11, wherein the packets conform to transmission control protocol/Internet protocol.

17. The system of claim 11, wherein the converting means is integral with the system.

18. The system of claim 11, wherein the converting means is external to the system.

19. The system of claim 11, wherein said means for retrieving data signals comprises at least one probe.

20. The system of claim 11, wherein said means for storing comprises direct memory access.

* * * * *

UNITED STATES PATENT AND TRADEMARK OFFICE
CERTIFICATE OF CORRECTION

PATENT NO. : 6,636,789 B2
APPLICATION NO. : 09/844616
DATED : October 21, 2003
INVENTOR(S) : John A. Bird et al.

It is certified that error appears in the above-identified patent and that said Letters Patent is hereby corrected as shown below:

<u>Column 6</u>
Line 45, please replace "pockets" with --packets--.

Signed and Sealed this

Twenty-second Day of May, 2007

JON W. DUDAS
*Director of the United States Patent and Trademark Office*